US008212911B2

(12) United States Patent
Nonaka (10) Patent No.: US 8,212,911 B2
(45) Date of Patent: Jul. 3, 2012

(54) IMAGING APPARATUS, IMAGING SYSTEM, AND IMAGING METHOD DISPLAYING RECOMMENDATION INFORMATION (75) Inventor: Osamu Nonaka, Sagamihara (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 699 days.

(21) Appl. No.: 12/183,290

(22) Filed: Jul. 31, 2008

(65) Prior Publication Data

US 2009/0040324 A1 Feb. 12, 2009

(30) Foreign Application Priority Data

Aug. 10, 2007 (JP) ................................. 2007-209140

(51) Int. Cl.
*H04N 5/222* (2006.01)
(52) U.S. Cl. ............................... 348/333.04; 348/333.02
(58) Field of Classification Search ............... 348/220.1, 348/333.01, 333.02, 333.03, 333.04
See application file for complete search history.

(56) References Cited

U.S. PATENT DOCUMENTS

| 7,417,679 | B2 * | 8/2008 | Kuruma | 348/333.02 |
| 2003/0197792 | A1 * | 10/2003 | Kikuchi | 348/220.1 |
| 2006/0023100 | A1 * | 2/2006 | Chosa | 348/333.01 |
| 2007/0065137 | A1 * | 3/2007 | Hara et al. | 396/291 |
| 2007/0109429 | A1 * | 5/2007 | Suzuki et al. | 348/231.99 |
| 2007/0153111 | A1 * | 7/2007 | Kato | 348/333.11 |
| 2007/0171282 | A1 * | 7/2007 | Yanagi | 348/207.99 |
| 2009/0135269 | A1 * | 5/2009 | Nozaki et al. | 348/222.1 |

FOREIGN PATENT DOCUMENTS

| JP | 2006-101111 | 4/2006 |
| JP | 2007-166250 | 6/2007 |
| JP | 2007-287014 | 11/2007 |

* cited by examiner

*Primary Examiner* — Albert Cutler
(74) *Attorney, Agent, or Firm* — John C. Pokotylo; Straub & Pokotylo (57) ABSTRACT

An imaging apparatus includes an imaging section converting an image into image data, an image classifying section classifying the image data, and a display section for displaying information regarding a recommended image as a shooting object based on a classification result by the image classifying section. Further, a server having a shooting assist function receives image data from an imaging apparatus that has an imaging section converting an image into the image data and includes a scene determining section classifying the received image data and determining whether a typical image has been taken repeatedly, a guide information section outputting information regarding a recommended image as a shooting object based on a determination result by the scene determining section, and a communication section outputting the information to the imaging apparatus.

16 Claims, 9 Drawing Sheets

PRIOR ART

FIG. 9

IMAGING APPARATUS, IMAGING SYSTEM, AND IMAGING METHOD DISPLAYING RECOMMENDATION INFORMATION

Benefit is claimed, under 35 U.S.C. §119, to the filing date of prior Japanese Patent Application No. 2007-209140, filed on Aug. 10, 2007. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus, an imaging system, and an imaging method, and specifically relates to an imaging apparatus, an imaging system, and an imaging method capable of shooting objects, classifying these shot object images, and displaying advice information for a shooter according to the result thereof.

2. Description of the Related Art

Recently, an image viewing method has become widely popular, in which images are taken with an imaging apparatus such as a digital camera and transmitted utilizing a communication facility such as PC communication, the Internet, or a mobile phone line, and the images are viewed in this environment. By using such a communication facility, people can enjoy images in such various ways that people can post up photographs taken by themselves on blog pages or the like to allow many other people to view the photographs, or people can transmit images to a large-size TV screen to allow viewing of the images by many people at the same time.

In a time of conventional silver-halide films, people were concerned about film consumption or expenses for development and could only enjoy to take one final image, but the image viewing has been changed in the above described present environment from viewing the one final image to enjoying many images as a piece of work. When enjoying a series of images such as in a photo album, people desire a photo album that one can understand a shooting situation easily by viewing multiple images without any particular explanation.

For example, even if photograph images of a grandchild's event such as a field day or a performance day are transmitted to a reproducing apparatus such as a TV set in a house of their grandparents who can not go to view the photographs, the grandparents can not feel the atmosphere sufficiently with only an image of their grandchild playing a sport and desire to view a photograph of their child who is a parent of the grandchild. In this manner, when images are easily transmitted to remote people in addition to people close to a shooter, there are also frequently required object images which the shooter is not particularly conscious of.

Figure 9:
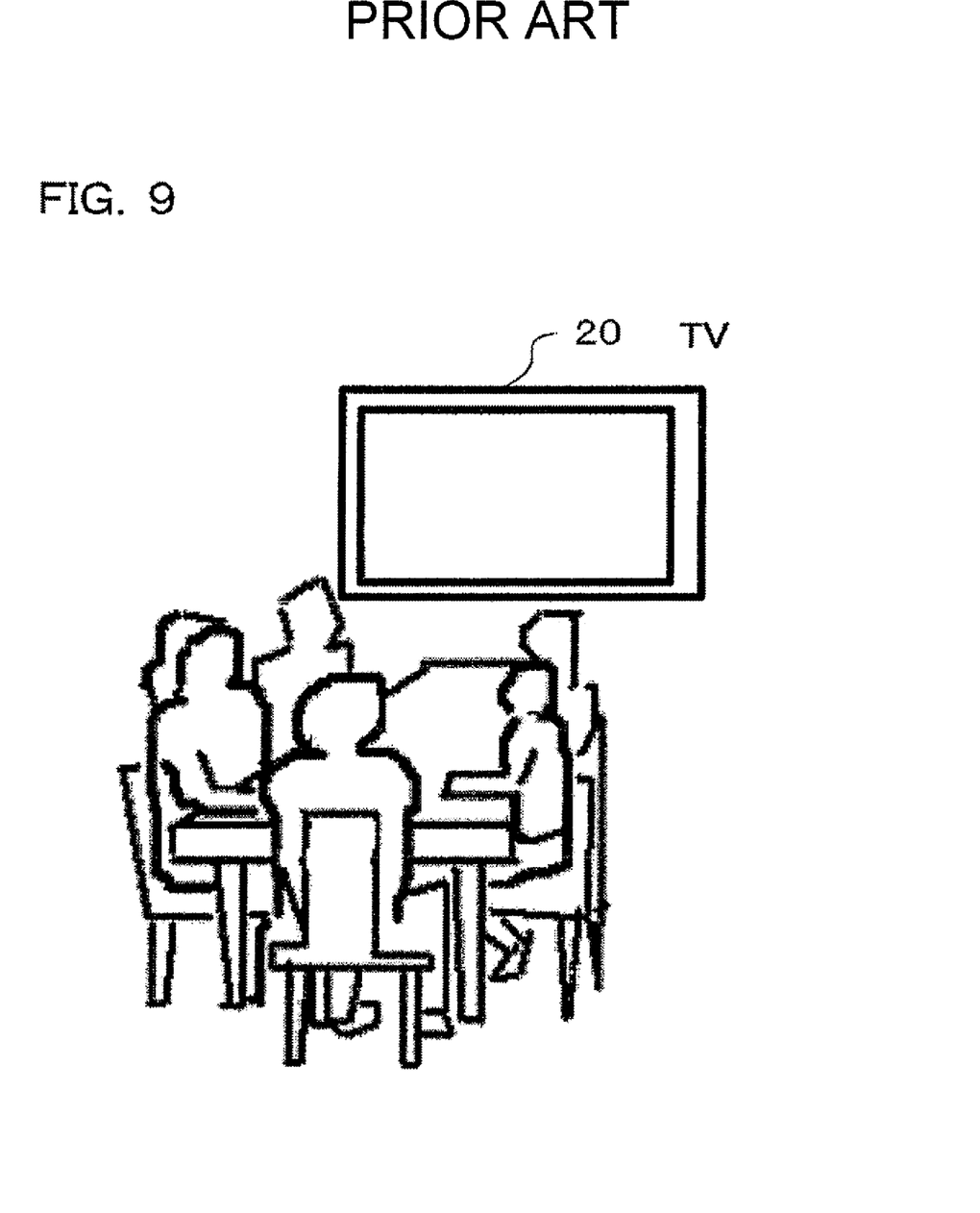
FIG. 9 is a diagram showing a conventional scene where an image taken with a camera is viewed on a TV screen.

Further, as shown in FIG. 9, when an image taken with a camera is displayed on a screen of a TV 20 and viewed by a family, even family members other than a person of the image object are not much interested therein, if only the person too frequently appears in the screen. If the image shows a place or a site where the event was held or people who watched the event, a high realistic sensation can be transmitted and people other than the person of the shooting object can enjoy the image which is appreciable enough.

For shooting an image such as one in which people other than a person of the shooting object are interested in, an image recognition technique becomes important for a camera to assist the shooting. Recently, there has been widely used a technique detecting a face portion from an image in consumer oriented cameras in addition to security cameras (Japanese Unexamined Patent Application Publication No. 2006-101111 (published on Apr. 13, 2006, hereinafter, referred to as Prior Art 1), a technique determining similarity of images on the Internet, or the like. Further, a technique connecting a camera wirelessly to the Internet, a technique displaying content on the Internet on a home appliance, etc. are being widely used.

In an imaging apparatus disclosed in the above Prior Art 1, a shot image is preliminarily stored in a file for matching and another shot image is determined whether or not it matches the image stored in the file for matching, and then, according to this matching result, it can be confirmed whether a desired shooting object has been shot or not.

Further, in an image processing apparatus disclosed in Japanese Unexamined Patent Application Publication No. 2007-287014 (published on Nov. 1, 2007) or the like, there is proposed a technique for displaying images classified for each event by classifying persons taken in the images. However, each of these disclosed techniques is a technique for a user to remember shooting of images which the user decided to shoot preliminarily.

Still further, in a camera disclosed in Japanese Unexamined Patent Application Publication No. 2007-166250 (published on Jun. 28, 2007), there is proposed a technique to indicate a picture composition to a shooter. However, this technique is just for assisting a user to decide the picture composition.

Although cameras are employing many kinds of techniques widening a control rage of exposure or focusing, widening a field angle range by a zoom lens, or the like for improving a shooting range, many users tend to shoot only similar objects using similar picture compositions in similar situations, and therefore have not fully utilized such a potential capability of the camera.

SUMMARY OF THE INVENTION

The present invention provides an imaging apparatus, an imaging system, and an imaging method capable of shooting an image such as one in which people other than a shooter or a person of a shooting object are also interested in, according to an individual situation.

An imaging apparatus according to the present invention includes an imaging section converting an image into image data, an image classifying section classifying the image data, and a display section for determining a situation in which a shooter is unconsciously shooting only similar images, based on a classification result by the image classifying section, and displaying information regarding a recommended image as a shooting object for allowing the shooter to obtain images with variety.

Further, an imaging system according to the present invention includes an imaging section converting an object image into image data, an image classifying section classifying the image data, and a display section for displaying information regarding a recommended image as a shooting object based on a classification result by the classifying section.

Still further, an imaging method according to the present invention converts an image into image data, classifies the image data, and displays information regarding a recommended image as a shooting object based on the classification.

Moreover, a server having a shooting assist function according to the present invention receives image data from an imaging apparatus having an imaging section which converts an image into the image data, the server including a scene determining section classifying the received image data and determining whether a typical image has been taken repeatedly, a guide information section outputting information regarding a recommended image as a shooting object based on a determination result in the scene determining section, and a communication section outputting the information to the imaging apparatus.

DETAILED DESCRIPTION OF THE PREFERRED EMBODIMENTS

Hereinafter, preferred embodiments using an imaging apparatus, to which the present invention is applied, will be described with reference to the drawings. An imaging apparatus according to a first embodiment of the present invention is a digital camera. This digital camera, in outline, displays an object moving image on a display device using object image data obtained by an imaging element and also can record still image data into a recording medium in response to release button operation. This digital camera includes a function classifying the object images, that is, the digital camera can classify the shot images into a single person image, group image, landscape image, etc. and display a shooting tendency by using an image determination technique in addition to a zoom function or focusing function of a conventional camera, and also, when a typical image shooting such as multiple-frame shooting targeting the same person is to be carried out, the digital camera can display a notice about the typical image shooting.

When such imaging capturing of a typical scene is continued, although people who like the scene can enjoy the images, people who do not like the scene might be forced to view the uninteresting images for a long time and the viewing might be a kind of torture for the people. Further, the people who like the typical scene can also enjoy the images more if another type of image is inserted as an accent.

Accordingly, displaying images having variety as much as possible can avoid such a problem in a situation where many images are displayed on a TV screen wherein many people view the images, or in a scene where various images are arranged for viewing such as a photo album, for example.

However, generally a shooter is absorbed in an object, which the shooter himself/herself is interested in, at a shooting location and often takes typical images unconsciously. The present embodiment provides an imaging apparatus capable of taking images with variety to avoid this problem.

Figure 1:
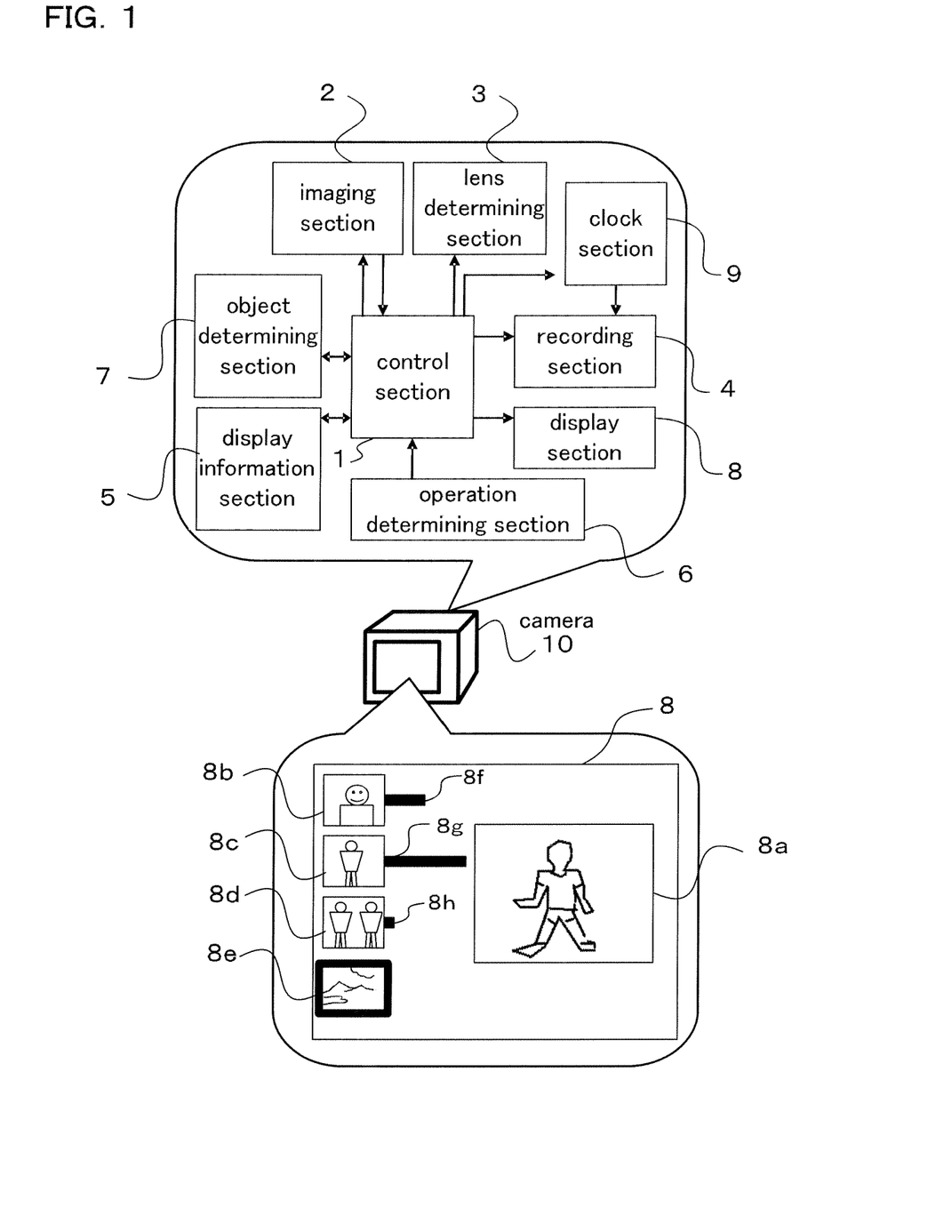
FIG. 1 is a block diagram of a camera according to a first embodiment of the present invention.

Hereinafter, there will be described in detail an example of a digital camera to which the imaging apparatus according to the first embodiment is applied. FIG. 1 is a block diagram of a digital camera 10 according to the first embodiment of the present invention. The camera 10 includes a control section 1, an imaging section 2, a lens determining section 3, a recording section 4, a display information section 5, an operation determining section 6, an object determining section 7, a display section 8 and a clock section 9.

The control section 1 is configured with an MPU (Micro Processing Unit) and the like and connected with each section of the above imaging section 2 to the clock section 9. The control section 1 receives signals from each of these sections and outputs control signals to control the whole camera 10. The imaging section 2 includes a shooting lens for focusing an object image and performs photoelectric conversion of this object image focused by the shooting lens to output an image signal.

The lens determining section 3 can determine a zoom position (focal length and zoom magnification) and a focus position (object distance) of the shooting lens, and information of the zoom position and the focus position determined in this section can be additionally recorded when shot image data is recorded.

The recording section 4 performs compression processing of image data using the image signal output from the imaging section 2 and records the compressed image data into a recording medium. The clock section 9 is a clock measuring date and hour and can record this date and hour information additionally when the shot image data is recorded in the recording section 4.

The operation determining section 6 detects the states of operation members provided in the camera 10 such as an operation switch, an operation dial, etc. and determines operation states thereof. The object determining section 7 has a face detecting function determining a face position or size in the image according to a shade and shadow pattern showing a feature of a human face.

The object determining section 7 includes respective detection sections detecting a distribution of contrast or brightness in the screen and further color shade thereof or the like, and has a function analyzing a feature of the shot image and determining to classify whether the object image is taken in a single person shooting, a group shooting, or a landscape shooting.

The display information section 5 classifies the shot images, which are obtained by the imaging section 2 and recorded in the recording section 4, based on the determination by the object determining section 7 and determines the shooting tendency, and also provides a notice when only particular images are being taken.

The display section 8 displays the object image based on the image data output from the imaging section 2 in a live-view mode as a moving image, and can be utilized as a viewfinder during shooting. Also, the display section 8 reads out the image data recorded in the recording medium of the recording section 4 and displays the image data after decompression processing in response to the operation of a reproduction button or the like. Further, the display section 8 displays the shooting tendency according to the output of the display information section 5 and also displays a notice when only particular images have been taken excessively.

The display section 8 is provided on the rear side of the camera 10, and, in the example shown in FIG. 1, the shooting image tendency is shown on the left side of the display section 8 and the live view display 8a is shown on the right side thereof. The shot images are classified into a portrait image 8b, a single person image 8c, a group image (multiple person image) 8d, and a landscape image 8e, and the numbers of frames of the shot images are shown for respective classified images by bar graphs 8f, 8g, and 8h on the right side, respectively.

In the example of the display section 8 shown in FIG. 1, most of the shot images are the single person images 8c and there are a few group images 8d, and there are a small number of photographs conveying surrounding atmosphere such as a landscape. Accordingly, the display section 8 shows the landscape image 8e with a bold line box and provides a notice that only monotonous images are being obtained, and also shows the landscape image as a recommended image. The live view display on the right side also shows that a notice has been provided since images with a similar tendency are going to be taken. Note that obviously this notice or recommended image may be displayed by showing the bold line box with an outstanding color such as red or by showing the category name with a character or a symbol, and further may be displayed in other various display methods such as a blinking box.

In this manner, the present embodiment displays what kinds of images have actually been taken by showing contents thereof on the display section 8 visually for easy understanding. Further, since the display contents show results obtained from the analysis of actually shot images, a user can understand his or her own shooting tendency instantly and determine what is missing.

When such a display is set to be shown before shooting, the user can perform an elaborate shooting even for shooting the same object, such as a shooting by controlling the field angle using the zoom lens to switch from a portrait shooting for a larger face image to a snap shooting for picking up the background or other persons.

Next, there will be described operation of the shooting assist display in the digital camera 10 according to the present embodiment with reference to a flowchart shown in FIG. 2. This example particularly shows control when the camera 10 is set for a shooting mode. When the flow of the camera control starts, a live view display starts first (S1). In this live view display, a moving image of an object is displayed on the display section 8 based on the output of the imaging section 2 as described above. A shooter can determine a picture composition by monitoring the live view display instead of an optical viewfinder.

Next, it is determined whether or not the user has set a guide mode (shooting assist mode) (S2). This guide mode is a mode performing a guide display for shooting, and displays a tendency of shot images and also a notice as the typical image when only monotonous images have been obtained, as described above. The guide mode is set by a not-shown operation member and the operation determining section 6 detects whether the guide mode has been set.

According to the determination result in step S2, if the guide mode is not set, the process jumps to a step S6, and on the other hand, if the guide mode is set, a subroutine of display-necessity is executed to determine whether or not the guide display is necessary, by analyzing the live view image (S3). That is, this subroutine determines that the guide display is necessary when the live view image is the same again as a shot image recorded in the recording section 4, or when only similar images are being taken. This subroutine will be described hereinafter with reference to FIG. 3.

Subsequently, according to the determination result for the display-necessity in step S3, it is determined whether or not the guide display is necessary (S4). According to the determination result, if the display is not necessary, the process jumps to a step S6, and on the other hand, if the guide display is necessary, an image necessary for the shooter is displayed (S5). That is, as exemplarily shown on the display section 8 of FIG. 1, the tendency of the shot images is displayed and also what kind of image (recommended image) is necessary is displayed with a bold line box or the like for the notice. When the notice is displayed, the user can perform a photo shooting not to bore viewers providing variety to a series of shot images by changing the object according to the displayed notice.

Next, it is determined whether or not the release button has been pressed for shooting (S6). According to the determination result, if the shooting is not carried out, the process returns to step S2 and the above described operation is carried out. On the other hand, if the release button is pressed, the shooting is carried out (S7). For the shooting, image data of the object is acquired by the imaging section 2 and recorded in the recording section 4 after compression processing. In the recording, the shooting date and hour information obtained from the clock section 9 is additionally recorded (S8). Further, other information such as the zoom position information, focus position information, etc. is also additionally recorded.

Subsequently, the image classification is carried out (S9). For the image classification, the shot images are classified into the portrait image, single person image, group image, landscape image, etc. as exemplarily shown in FIG. 1. The classification result in this image classification is used for the display of the image tendency when this flow returns and the step S5 is carried out again. The detailed operation of the image classification will be described hereinafter with reference to FIG. 4.

Figure 3:
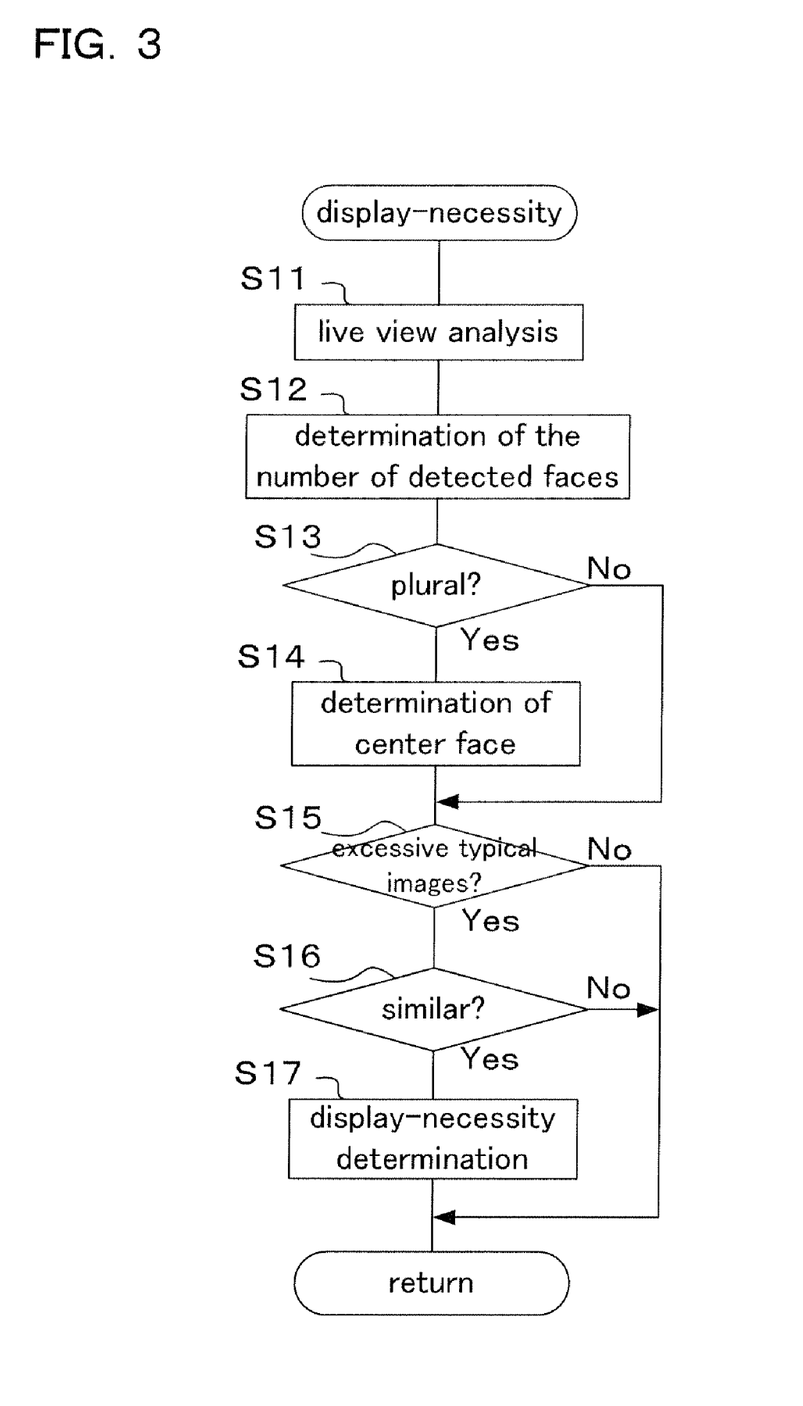
FIG. 3 is a flowchart showing display necessity operations in the camera according to the first embodiment of the present invention.

Next, the subroutine determining whether or not the guide display is necessary in step S3 will be described with reference to FIG. 3. When the process enters this subroutine, analysis of the live view image is carried out first (S11). In this analysis, the object determining section 7 detects a face from the image. Subsequently, the number of the detected object faces is determined (S12). It is determined whether or not there are plural detected faces (S13). If there are not plural faces, the process jumps to a step S15 and if there are plural faces, a face existing in the center is selected (S14).

Subsequently, it is determined whether or not the typical images are excessive (S15). This step uses the face selected in the previous step and determines whether or not the number of the typical images is larger than a predetermined number by comparing the face with the typical image. This typical image means a boring image for viewing when only the similar typical images have been taken, and people can not enjoy photograph viewing if there are many typical images. The determination of whether or not the typical images are excessive will be described in an image classification subroutine shown in FIG. 4. When the image in the live view display is similar to the typical image, the situation thereof becomes a candidate for the assist-need-display.

In step S15, if it is determined that the typical images are not excessive, the process returns to the flow start point. On the other hand, if the typical images are excessive, it is determined subsequently whether or not the images are similar images (S16). This determination determines the images to be the similar images when the aspects of the faces are similar to each other or when a particular person is shot in the images. Further, the background of the image may be taken into consideration for the similar image determination.

In the determination result in step S16, if the images are not similar to each other, the process returns to the flow start point. On the other hand, if the images are similar to each other, the assist-need-display is determined to be necessary (S17). That is, when most of the images in the live view display are the typical images having boring picture compositions and also images shooting a particular person, it is determined that the assist-display is necessary to display a notice against shooting the image in the live view display. By this determination, the display for the notice is carried out in the above described step S5 (refer to FIG. 2).

Figure 4:
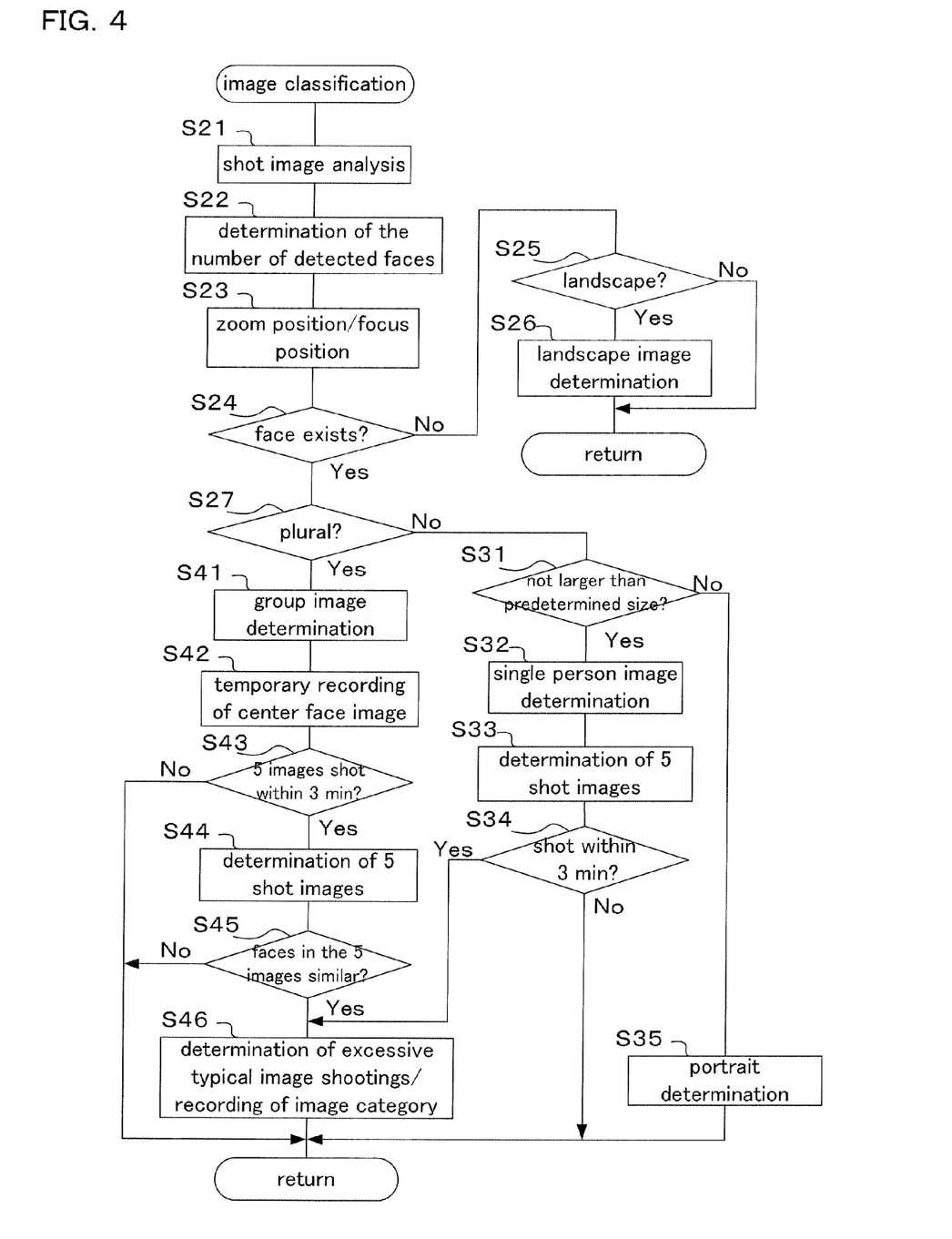
FIG. 4 is a flowchart of image classification operations in the camera according to the first embodiment of the present invention.

Next, the image classification subroutine in step S9 (refer to FIG. 2) will be described with reference to FIG. 4. Note that it is also determined in this subroutine whether or not the typical images are excessive. When the process enters this image classification subroutine, the object determining section 7 analyzes the shot images first (S21).

Subsequently, according to this analysis result, the number of detected faces is determined (S22). Further, the zoom lens set position (digital zoom is taken into consideration when the digital zoom is additionally used) and the focus position during the shooting, which are recorded together with the image, are determined (S23). By determining the set position of a shooting optical system, a distance to a focused object can be known and, if the distance is a long distance, it is possible to determine that the image is a landscape image, for example.

Next, it is determined whether or not a face exists in the image (S24). According the determination result, if a face does not exist in the image, it is determined whether or not the image is a landscape image (S25). The determination about the landscape image is performed using image recognition or the focus position information during the shooting. According to the determination result, if the image is not the landscape image, the process returns to the flow start point, and if the image is the landscape image, it is determined that the image is the landscape image (S26). Then, in this step, the number of the landscape images is incremented by one to be utilized for the bar graph display shown in FIG. 1.

If a faces image exists according to the determination result in step S24, it is determined whether or not the number of the face images is plural (S27). If there exist plural face images according to the determination result, it is determined that the image is a group image (S41) and the face image in the center is temporarily stored (S42).

Subsequently, it is determined whether images have been taken in the number not smaller than a predetermined number of five in a predetermined time of three minutes (S43). According to the determination result, if No, the process returns to the flow start point, and, on the other hand, if YES, five face images previously stored temporarily are collected and compared for determination (S44). According to the determination result in this step, if these five or more images are not similar images, the process returns to the flow start point. Note that the predetermined time of three minutes and predetermined number of images of five may be determined as design values, as needed, and the values can be changed.

On the other hand, if the five face images are similar to each other in the determination result in step S45, it is determined that the typical images have been taken excessively, assuming a situation of shooting only the typical images which are boring when viewed afterward (S46). Further, at this time, picture compositions of the images are also determined. For example, a face size or position in the image may be recorded, and further, the face image itself may be recorded assuming a detailed image matching capability and a sufficiently large recording area.

Further in step S46, it is also determined for shooting whether the images have the same person as a main object. If the images have only the same person as a main object, then a notice may be provided to advise shooting another person, for example. In this case, it is displayed that it is also better to take another image. This is because, when the same person is always shot in the image in the center for a main role, the interest of the other persons will be lost.

When only the person in the center is determined, it is possible to reduce a time required for the same person determination and improve determination accuracy thereof. Further, when all the persons in the image are determined, there is a possibility that the images is determined to be a typical image even when the same person is always shot at an edge of the image. It is not preferable that the image of a person who appears only in the edge is displayed for notice as the typical image.

That is, in a photograph, because it has a limited image area, different arrangement of persons provides a large difference in the impression thereof, and photographs always having the same person in the center are often not interesting for people other than the people related to the person in the center. Even when another person is shot in the image, if the person is shot on the side of the center person, the person sometimes feels dissatisfaction that he could not play a main role.

Further, when the same person is always shot in the center among such many persons shot in the same image, the images are assumed to be shot in a scene where a parent shoots only his/her own child on a field day, performance day, or the like. In this situation, the parent is preoccupied by his/her own child and easily forgets to shoot other scenes. Accordingly, the idea of the present embodiment makes it possible to shoot images with wide variety.

In step S27, if the number of the face image is one in the determination result, it is then determined whether the size of the face image is not larger than a predetermined size (S31). If the size is not larger than the predetermined size in the determination result, the image is determined to be the single person image (S32). In this case, the image is assumed to be taken in a scene of a field day, performance day or recital where it is difficult to take images near the object.

Subsequently, as in step S44, five shot images are determined (S33), and it is determined whether the five shot images have been taken within three minutes (S34), for example. If the images have been taken within three minutes in the determination result, the process goes to the above described step S46, and it is determined that the typical images are excessive. That is, if five shot images have been taken within three minutes, it is assumed that the shooter also has shot only an object of one person unconsciously and forgets to shoot other images, and it is determined that the typical images are excessive. Further, if the images have not been taken within three minutes, the process returns to the flow start point.

If the face image is larger than the predetermined size in the determination result of step S31, it is determined that the image is a portrait image (S35). That is, for a single person photograph, an image having a large-size face image is considered to be taken in a case in which the shooter wants to be genuinely dedicated to shooting only the object, such as a model photo session.

In such a case, the typical images are close-up face images of the portrait reflecting the intention of the dedicated shooter, and the typical image determination may not be carried out. In this manner, even the shooting scene is automatically determined and the monotonous shooting which easily occurs in such a situation is prevented. Thereby, it is possible to avoid a situation where an unnecessary image is displayed in an unnecessary scene to divert the user's attention. Note that obviously the typical image determination may be carried out.

After the portrait determination in step S35, the process returns to the flow start point. Note that the process may not return to the flow start point and the determination for the number of images within the predetermined time may be provided as in step S33 and the following step, since additionally shot photographs might become a good memory afterward even in this case.

In this manner, the present embodiment classifies shot images into the landscape image (S26), single person image (S32), group image (S41), and portrait image (S35) and counts the number of the shot images, respectively. The result of this image classification count is displayed on the display section 8 as the bar graphs 8f, 8g, and 8h in step S5.

Further, in the image classification subroutine, the typical images are determined to be excessive in the following cases: (1) five or more group images have been taken within three minutes and also face images in the centers are similar images to suggest a high probability that the same person is shot; and (2) the most recent five single person images have been taken within three minutes.

Here again, such typical image determination may be carried out also for the portrait shooting. In many model photo sessions, while beginners shoot only images having similar picture compositions from the same position, experienced shooters devise to come near or away from a model, to change a shooting angle in addition to the field angle, or to change the facial expression and pose of the model for the shooting.

That is, in face detection, facial aspect detection, determination of vertical-horizontal switching in the picture composition, and determination of the difference in the distance or zooming, if these are in similar situations or settings, a similar typical image determination may be carried out. In the description of the present embodiment, however, these detailed applications are not illustrated in order to show explicitly that a shooting scene is determined from shot images and a typical image can be determined thereby.

Figure 5A:
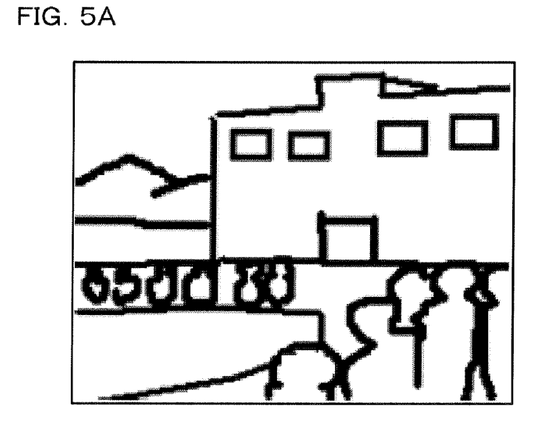
FIG. 5A, FIG. 5B and FIG. 5C are diagrams illustrating shot images in the first embodiment of the present invention.
Figure 5B:
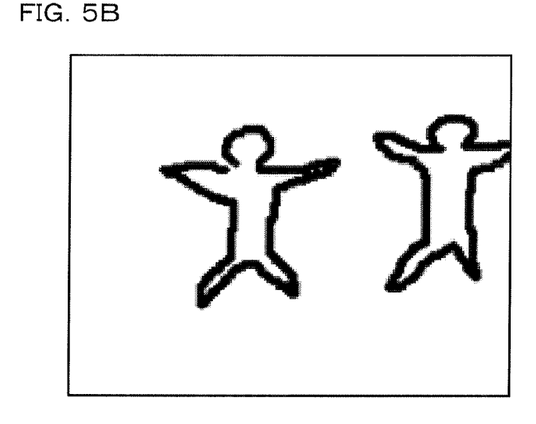
Figure 5C:
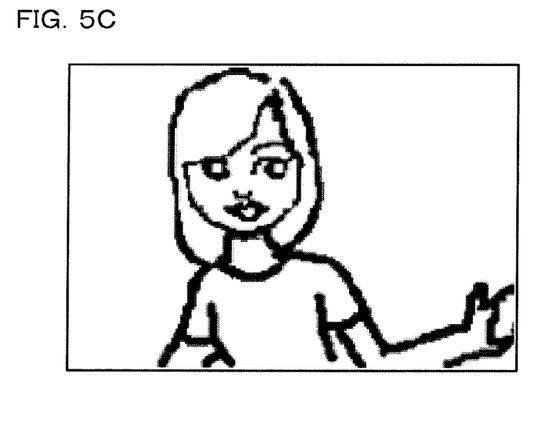

By carrying out the flows in the present embodiment, it becomes possible to avoid a situation where only the typical images as shown in FIG. 5B are displayed, and to make a photo collection or photo album which has variety or a plot by mixing a landscape of a site as shown in FIG. 5A or an image closer to an object as shown in FIG. 5C even for the same person. Accordingly, it is possible to prevent a shooter from being absorbed in an interest at hand and focused too much on shooting, and thereby to avoid a failure of forgetting to shoot objectively interesting images with wide variety.

Next, a second embodiment of the present invention will be described with reference to FIG. 6. While images are prevented from becoming the typical boring images by the determination focused on a face position or size in the first embodiment of the present invention, the second embodiment determines whether or not images are the typical images in consideration of other elements. This second embodiment is the same as the first embodiment except for a change from the image classification subroutine shown in FIG. 4 to a flow shown in FIG. 6, and the difference will be mainly described.

Figure 6:
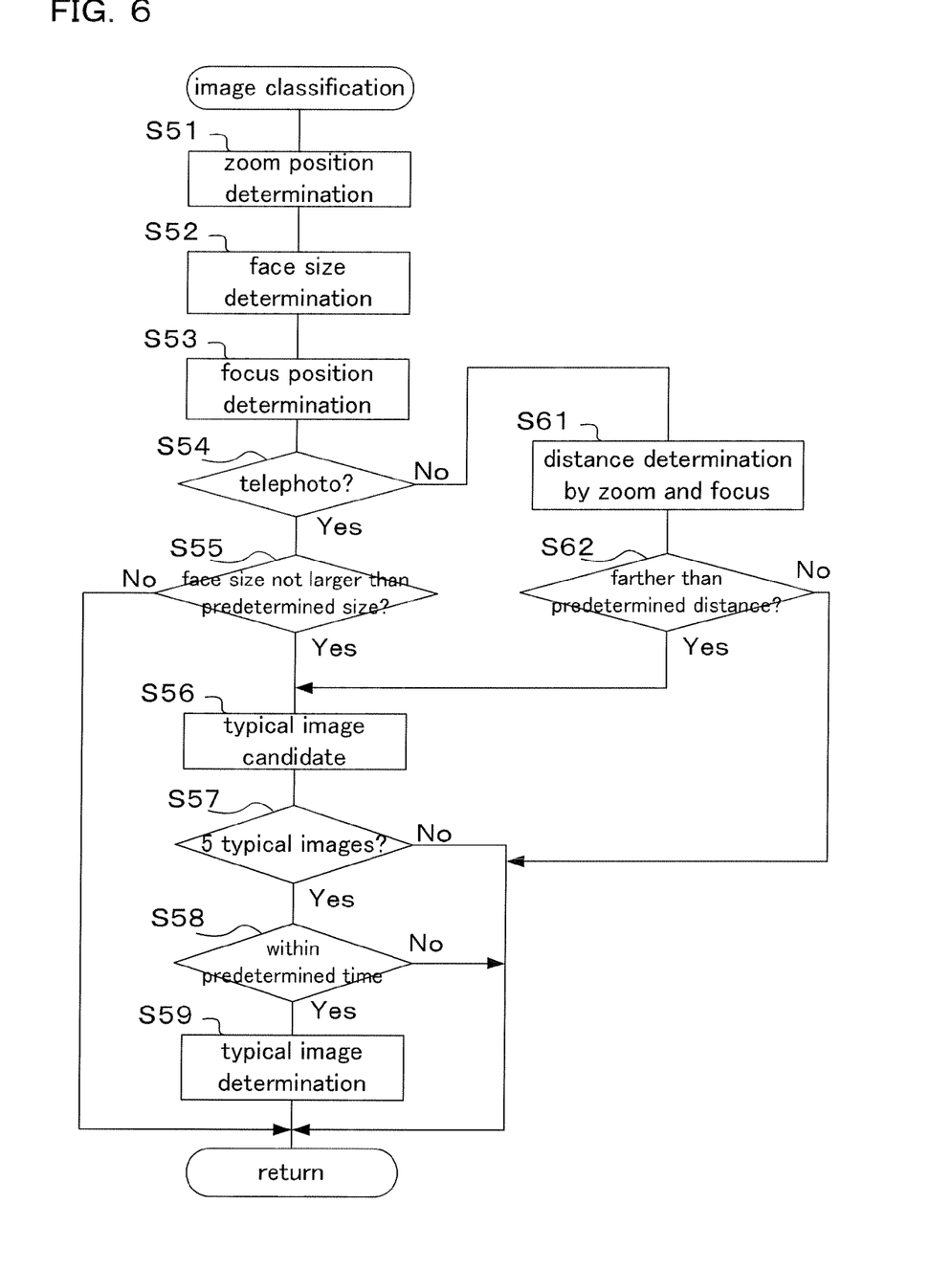
FIG. 6 is a flowchart of image classification operations in a camera according to a second embodiment of the present invention.

When the process enters an image classification subroutine shown in FIG. 6, the zoom position during shooting, which is recorded accompanying the shot image, is determined first (S51). Subsequently, a face size in the image is determined (S52), and the focus position of the shooting lens during shooting, which is recorded accompanying the shot image, is determined (S53).

Next, using the zoom position obtained in step S51, it is determined whether or not the zoom position is on the telephoto side than a predetermined focal length (S54). In an event such as a field day or performance day, a shooter is apt to shoot on the telephoto side for shooting his/her child far away, and then the field angle becomes narrow and the viewing field becomes even narrower, resulting in an image that tends to have a little information which can not be enjoyed afterward. Therefore, the image taken on the telephoto side might be a candidate for the typical image.

If the telephoto shooting is determined to have been carried out in step S54, it is determined whether or not the face size in the image obtained in step S52 is smaller than a predetermined size (S55) While the image taken by the telephoto shooting might be a candidate for the typical image, there is a portrait image using a blurring effect of the telephoto lens and, in this case, the image is removed in this step from the typical image candidate since the face image thereof is large.

If the face size is larger than the predetermined size in the determination result of the step S55, the process returns to the flow start point, and, if smaller, the image becomes a candidate of the typical image (S56). That is, in the present embodiment, the image becomes a candidate for the typical image when the image has been taken in the telephoto shooting and the face size is small. Subsequently, it is determined whether or not five or more images for the typical image candidates have been taken (S57). Note that, while it is determined whether or not five or more images have been taken for the typical image candidates in the present embodiment, this number of five can be changed as needed.

According to the determination result in step S57, if the number of typical image candidates is smaller than five, the process returns to the flow start point, but if the number of typical image candidates is five or more, then it is determined whether or not these five typical image candidates have been taken within a predetermined time (S58). According to the determination result, if not within the predetermined time, the process returns to the flow start point without any processing, but if within the predetermined time, the typical image candidates are determined to be the typical images (S59) That is, when five or more typical image candidates have been taken within the predetermined time, there is a concern that the shooting is focused on one thing and has no variety to make the typical images which might be boring when viewed afterward, and the image is used for comparison not to repeat the similar shooting.

If the shooting is not the telephoto shooting in step S54, distance determination is carried out using the zoom position and the focus position (S61). If the zoom position and the focus position of the shooting optical system are known, distance information of the object can be obtained. Using the obtained distance, it is determined whether or not the object is far from a predetermined distance (S62).

When the distance information indicates a distance longer than the predetermined distance, there is no change in view points and a shot image tends to become boring when viewed afterward, and therefore the image in this case is made to be a candidate for the typical image. For example, when a person standing on a stage is shot, the object is positioned in a relatively long distance of 10 m to 20 m. In this situation, a shooter is apt to be dedicated to shoot the object on the stage and to forget shooting people who attend the event or a building where the event is held, and the shot images tend to become monotonous. In addition to the facial expression of such a person on the stage, a change in the facial expression of the same person after stepping down from the stage, or the like, is also interesting for shooting, but the shooter looses attention after the stage and forgets to take such photographs. Accordingly, the scene determination using the distance becomes an important judgment.

Then, if the distance is longer than the predetermined distance in the determination result in step S62, the process jumps to the step S56, where the above described step is carried out and, if the images are monotonous, the images are determined to be the typical images. On the other hand, if the distance is shorter than the predetermined distance, the process returns to the flow start point.

In this manner, the second embodiment of the present invention determines the images to be the typical images based on the focus position and zoom position during shooting and the face size, in the following cases: (1) the predetermined number of typical image candidates having the face sizes not larger than the predetermined size have been taken within the predetermined time in the telephoto shooting, or (2) the predetermined number of images have been taken within the predetermined time when the distance is longer than the predetermined distance in the non-telephoto shooting. By treating these shot images as the typical images, it is possible to provide the notice display or the like to the shooter, same as in the first embodiment.

As described hereinabove, the present embodiment determines the situation where the images tend to be monotonous by the determination of the face size, the distance change, and the zoom position, to avoid the situation.

The present embodiment assumes a situation such as a shooter shooting his own child on a stage in a school event wherein it has been mostly described that images taken by the telephoto shooting become the typical images. Obviously, also a wide angle shooting scene has a situation in which images tend to be monotonous. For example, when a shooter is dedicated to shoot the entire atmosphere at a party or the like, the shot images mostly become formless and the shooter forgets easily to shoot an image expressing the appearance of an individual person.

In such a situation, by sometimes inserting images focused on relatively fewer members, such as a close-up of a participant or an image of two to three persons side by side, people can enjoy more interesting images with wide variety. While the flows in the above illustrated examples do not accommodate up to such a party scene, a similar flow could prevent shooting monotonous images in such a scene.

Further, while the notice for the field angle or the like is mostly described here, advice may be provided to a shooter for other conditions other than the field angle. When a flower or the like is shot in a short distance, the scene is determined to be a scene of shooting a flower based on a feature of the image, a distance or the like, and an indication may be provided to change aperture or exposure, for example, for taking an image which has perspective expression of field depth or variety in color expression.

Next, a third embodiment of the present invention will be described with reference to FIG. 7 and FIG. 8. While, in the first and second embodiments, typical boring images are prevented in a stand-alone digital camera, the third embodiment determines, in conjunction with a server connected via a network, whether images are typical images or not and displays a tendency of the shot images, and further displays a notice when the typical images are likely to be taken.

Figure 2:
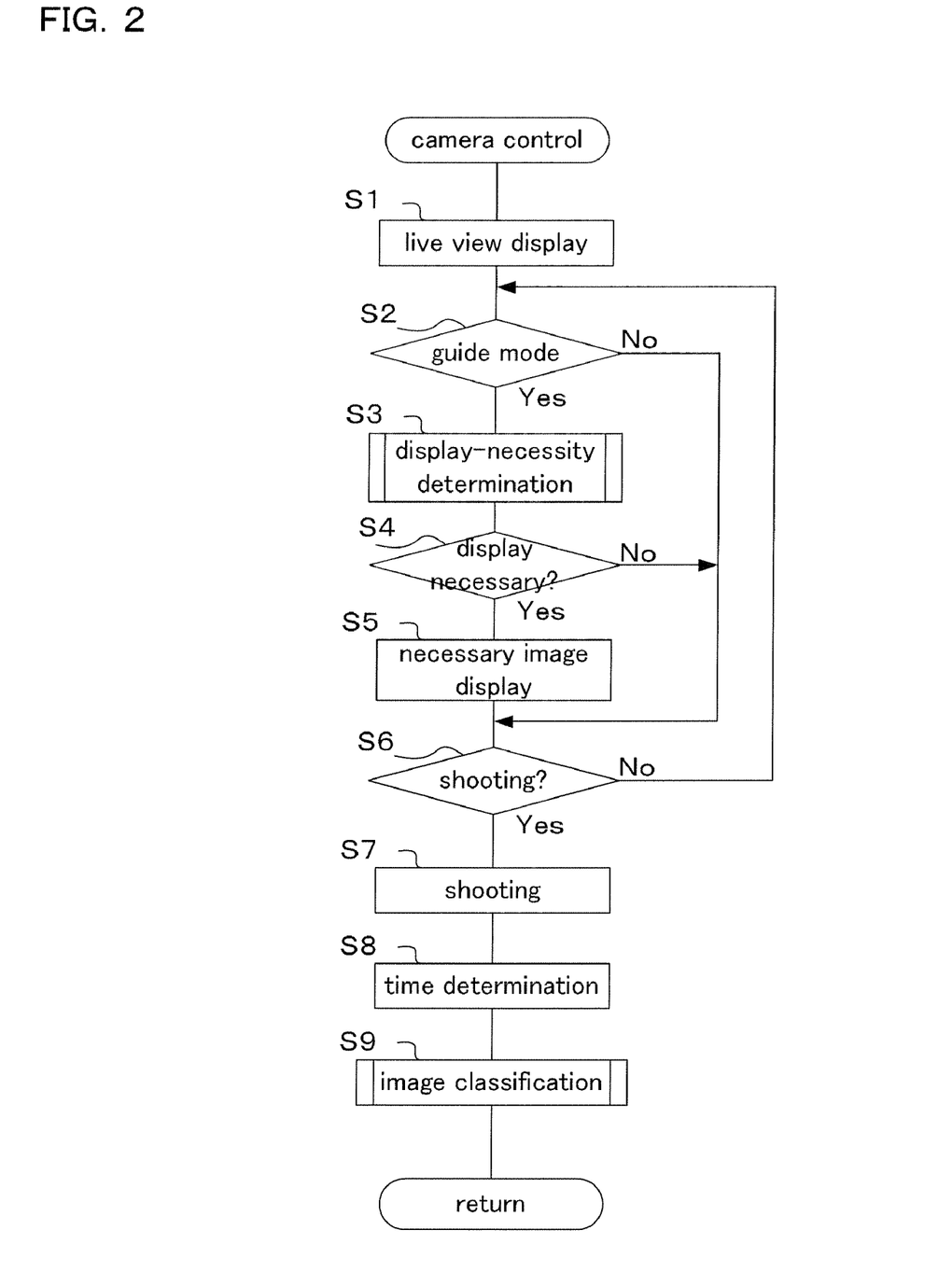
FIG. 2 is a flowchart showing camera control operations in the camera according to the first embodiment of the present invention.
Figure 7:
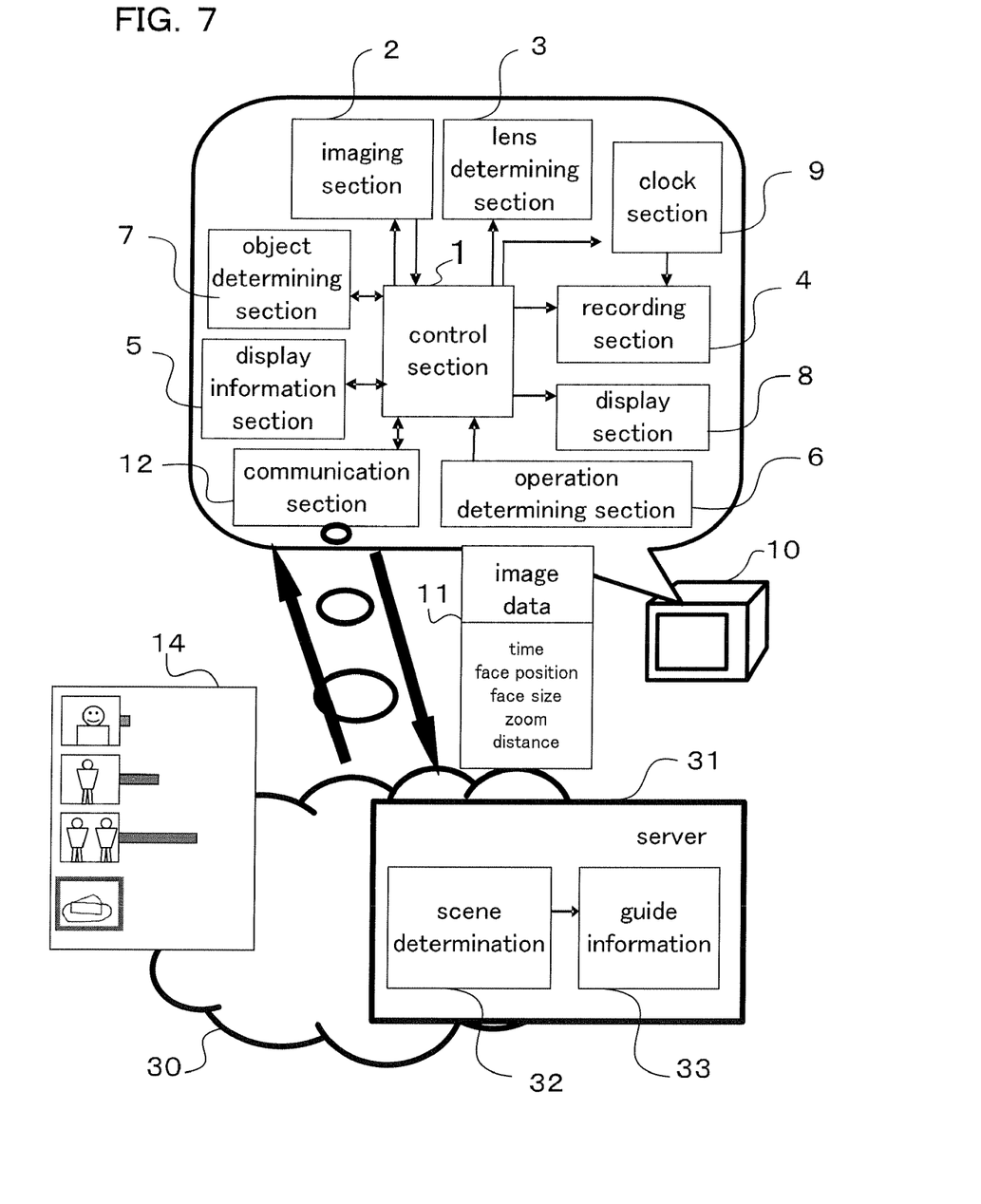
FIG. 7 is a block diagram of an imaging system including a camera and a server according to a third embodiment of the present invention.
Figure 8:
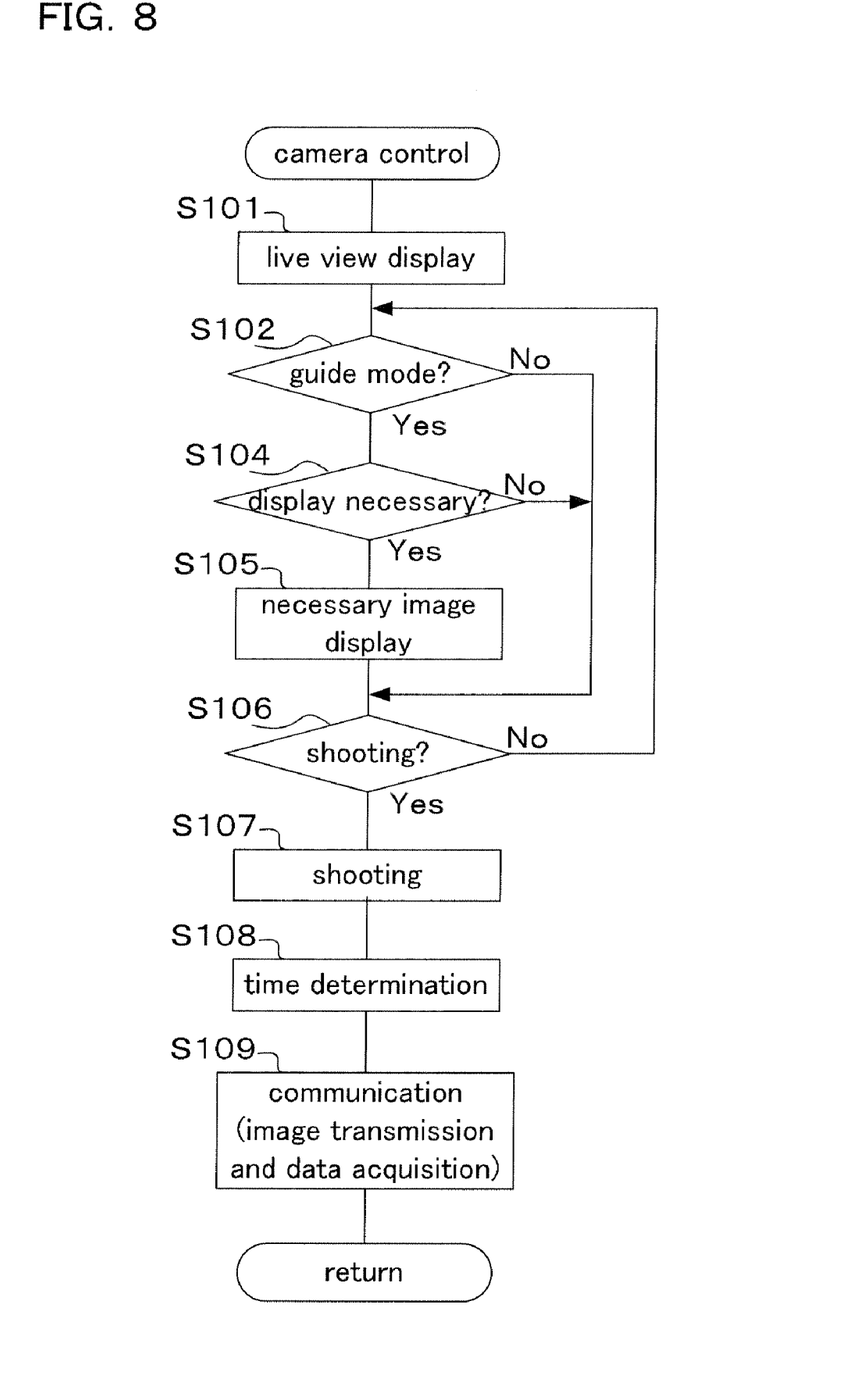
FIG. 8 is a flowchart showing camera control operations in the camera according to the third embodiment of the present invention.

This third embodiment is different from the first embodiment only in that the block diagram shown in FIG. 1 is replaced by a block diagram shown in FIG. 7 and the camera control flow shown in FIG. 2 is replaced by a flow shown in FIG. 8, and the different points will be mainly described.

A digital camera 10 according to the third embodiment is different from the digital camera 10 shown in FIG. 1 only in that the digital camera 10 of the third embodiment includes a communication section 12. This communication section 12 transmits and receives data to and from an external server 31 via a network 30 such as the Internet. The camera 10 transmits image data and data 11 accompanying this image data such as date and hour information (time), face position information, face size information, zoom position information, and distance information from the communication section 12 to the server 31.

A scene determining section 32 and a guide information section 33 are provided within the server 31. The scene determining section 32 analyzes and determines shot images, classifies the images, analyzes a tendency of the shot image, and determines whether or not the typical images are being shot, as in the first and second embodiments. Further, the guide information section 33 generates advice (assist or guide) information 14 to be displayed on the camera 10 according to the output of the scene determining section 32. The advice information 14 generated here is transmitted from a not-shown communication section to the camera 10 via the network 30.

The advice information 14 generated in the guide information section 33 is transmitted from a transmitting-and-receiving section of the server 31 to the communication section 12 of the camera 10 via the network 30. The camera 10 displays the received advice information 14 on a display section 8.

Operation of the camera 10 configured in this manner in conjunction with the server 31, will be described using a flowchart shown in FIG. 8. When a camera control flow starts, the live view display starts as in step S1 (S101). After that, operation similar to that in step S2 and steps S4 to S8 of FIG. 2 is carried out in a step S102 to a step S108.

While the first embodiment performs the image classification subroutine of step S9 in the camera 10, the third embodiment performs this job in the server 31. Accordingly, a step S109 transmits the data 11 to the server 31 and receives the advice information 14 from the server 31.

After the communication with the server 31 is completed, the process returns to the start point and repeats the operation from step S101. Then, step S104 determines whether or not the display of the shooting assist is necessary using the advice information received from the server 31, and step S105 acquires the advice to be displayed from the server and displays the shooting assist.

In this manner, the present embodiment performs the processes corresponding to the subroutines such as image classification subroutine, which are carried out within the camera 10 in the first and second embodiments, within the server 31. Since it is possible to perform various analyses or determinations by the connection to the external server having a high processing capability, high level image processing can be performed and more appropriate advice can be provided to a user.

Such an imaging system is very useful in a situation in which a large screen is installed in a party site, for example, and the camera transmits images to be displayed there sequentially. Images displayed on such a screen need to be enjoyed by many people and it is more important to avoid a self-satisfying monotonous shooting.

Assuming that a server also having computation capability is used, it becomes possible to classify images by facial expression or a pose, clothing style, a shot person, or a served dish or decoration in a room (these can be determined in an image in a short range without a person), in addition to the number of objects and the picture composition which have been described hereinabove and to advise a cameraman not to shoot monotonous images.

In particular, it becomes possible to determine before shooting whether an image to be shot is the typical image, and to devise the shooting not to increase similar images unconsciously and bore image viewers. That is, when the images are determined to be the typical images, the camera 10 shows a display such as the advice information 14 shown in FIG. 7, and suggests to a shooter that it is necessary to shoot a portrait of an individual person instead of an image of a large number of persons or sometimes a photograph of a dish or the like, as an image providing variety to the images.

As described hereinabove, each of the embodiments of the present invention captures a situation in which a viewer enjoys images and can shoot images suitable thereto, and thereby it becomes possible to provide an imaging apparatus and imaging system capable of generating content with a high degree of completion.

Note that while the present embodiments classify shot images into four categories; the single person shooting, group shooting, landscape shooting, and portrait shooting, the categories are not limited to these four categories and can be modified as needed by adding other shootings or the like, such as a dynamic shooting to shoot a moving object.

Further, while the present embodiments display a shooting frequency for each classified image on the display section 8 together with the live view image side by side, the display method can be changed variously and only the recommended images may be displayed or the shooting frequency and the live view image may be switched, for example.

Still further, while the present embodiments are described for the digital camera, the digital camera obviously may include a digital single-lens reflex camera, a compact digital camera or a built-in camera of a mobile phone or a PDA (Personal Digital Assistant). Still further, while the present embodiments are described for the still image data, this invention may apply to movie image data.

Note that the present invention is not limited to the foregoing embodiments without modification and can be realized for implementation by modification of the constituents thereof without departing from the spirit of the invention. Further, various inventions can be achieved by appropriate combinations of the plurality of constituents disclosed in the foregoing embodiments. For example, some of the entire constituents shown in the embodiments may be omitted. Still further, the respective constituents in the different embodiments may be combined appropriately.

What is claimed is:

1. An imaging apparatus, comprising:
   an imaging section converting an image into still image data;
   an image classifying section classifying the image corresponding to the still image data into a number of categories according to a plurality of conditions; and
   a display section for displaying image-related information which recommends an image belonging to a category, which includes a smaller number of shot images among images belonging to the categories, as an object to be shot based on a classification result by the image classifying section.

2. The imaging apparatus according to claim 1, wherein the imaging section converts an object image into moving image data and also converts the object image into the still image data in response to release button operation, and wherein the display section displays the information regarding the recommended image together with a moving image shot by the imaging section.

3. The imaging apparatus according to claim 1, wherein the imaging section converts an object image into moving image data and also converts the object image into the still image data in response to release button operation, and further includes a similar image determining section determining whether or not the moving image data is similar to predetermined reference image data classified by the image classifying section, and wherein the display section displays the information regarding the recommended image when the moving image data is determined to be similar to the reference image data by the similar image determining section.

4. The imaging apparatus according to claim 3, wherein the image classifying section sets, when still image data belonging to a predetermined category is captured within a predetermined time, the still image data as the reference image data.

5. The imaging apparatus according to claim 3, wherein the image classifying section sets, when still image data belonging to a predetermined category is captured in a predetermined number of frames within a predetermined time, the still image data as the reference image data.

6. The imaging apparatus according to claim 3, wherein the image classifying section sets, when still image data is captured based on a predetermined zoom magnification of a shooting lens in a predetermined number of frames within a predetermined time, the still image data as the reference image data.

7. The imaging apparatus according to claim 3, wherein the image classifying section sets, when still image data is captured based on a predetermined focal length of a shooting lens in a predetermined number of frames within a predetermined time, the still image data as the reference image data.

8. The imaging apparatus according to claim 1, wherein the plurality of conditions is one or more of (a) whether the image has a face, (b) whether the image has a plurality of faces, (c) whether a size of the face is greater than a predetermined size, and (d) whether the image is a landscape image.

9. The imaging apparatus according to claim 1, wherein the categories include one or more of (a) a single person image, (b) a group image, (c) a portrait image, and (d) a landscape image.

10. The imaging apparatus according to claim 1, wherein displaying the image-related information, which recommends the image belonging to the category, includes at least one of (a) displaying the recommended image with an emphasized border, (b) displaying the recommended image with a blinking border, (c) displaying a name of the category, to which the recommended image belongs, with a symbol, or (d) displaying a name of the category, to which the recommended image belongs, with a character.

11. An imaging system, comprising:
    an imaging section converting an object image into still image data;
    an image classifying section classifying the object image corresponding to the still image data into a number of categories according to a plurality of conditions; and
    a display section for displaying image-related information which recommends an image belonging to a category, which includes a smaller number of the shot images among the images belonging to the categories, as an object to be shot according to a classification result by the image classifying section.

12. The imaging system according to claim 11, further comprising: an imaging apparatus; and a server connected to the imaging apparatus via a communication line, wherein the imaging section and the display section are included in the imaging apparatus, and wherein the image classifying section is included in the server.

13. An imaging method, comprising:

converting an image into still image data;

classifying the image corresponding to the still image data into a number of categories according to a plurality of conditions; and displaying image-related information which recommends an image belonging to a category, which includes a smaller number of the shot images among the images belonging to the categories, as an object to be shot based on the classification.

14. The imaging method according to claim 13, further comprising:

recording the still image data; and displaying the recommended image when a reference image data is extracted from the recorded image data and the still image data currently captured is similar to the reference image data.

15. The imaging method according to claim 13, wherein the classification includes at least one classification among a landscape image, a single person image, a group image, and a portrait image.

16. The imaging method of claim 13, wherein displaying the image-related information which recommends the image includes at least one of (a) displaying the recommended image with an emphasized border, (b) displaying the recommended image with a blinking border, (c) displaying a name of the category, to which the recommended image belongs, with a symbol, or (d) displaying a name of the category, to which the recommended image belongs, with a character.

* * * * *